United States Patent
Sherlock

(10) Patent No.: US 12,252,095 B2
(45) Date of Patent: Mar. 18, 2025

(54) WORK VEHICLE, DOOR STATE DETERMINATION SYSTEM, AND METHOD OF DETERMINING STATE OF WORK VEHICLE DOOR

(71) Applicant: DEERE & COMPANY, Moline, IL (US)

(72) Inventor: Lance R. Sherlock, Asbury, IA (US)

(73) Assignee: Deere & Company, Moline, IL (US)

( * ) Notice: Subject to any disclaimer, the term of this patent is extended or adjusted under 35 U.S.C. 154(b) by 389 days.

(21) Appl. No.: 17/002,358

(22) Filed: Aug. 25, 2020

(65) Prior Publication Data

US 2022/0063559 A1 Mar. 3, 2022

(51) Int. Cl.
*B60R 25/20* (2013.01)
*B60R 25/01* (2013.01)
*G06V 20/56* (2022.01)
*H04N 7/18* (2006.01)

(52) U.S. Cl.
CPC .............. *B60R 25/20* (2013.01); *B60R 25/01* (2013.01); *G06V 20/56* (2022.01); *H04N 7/183* (2013.01)

(58) Field of Classification Search
CPC ..... B60R 25/20; B60R 25/2036; B60R 25/25; B60R 25/305; B60R 25/31
See application file for complete search history.

(56) References Cited

U.S. PATENT DOCUMENTS

| | | | |
|---|---|---|---|
| 6,549,130 B1* | 4/2003 | Joao | B60R 25/33 340/425.5 |
| 9,230,419 B2 | 1/2016 | Beggs et al. | |
| 10,018,171 B1* | 7/2018 | Breiner | F02N 11/0818 |
| 10,132,259 B1* | 11/2018 | Watson | F02N 11/0807 |
| 10,144,390 B1* | 12/2018 | Chaston | B60R 25/305 |
| 10,183,667 B2* | 1/2019 | Anderson | B60W 30/09 |
| 10,266,117 B2* | 4/2019 | Petzold | B60Q 1/00 |
| 10,318,609 B2* | 6/2019 | Blank | G07C 5/0825 |
| 10,452,353 B2* | 10/2019 | Anderson | E02F 9/24 |
| 11,012,667 B1* | 5/2021 | Nodder | G08B 25/008 |
| 11,453,363 B2* | 9/2022 | Pupillo | B60R 25/102 |
| 2003/0212480 A1* | 11/2003 | Lutter | G01S 13/931 340/436 |
| 2007/0001829 A1* | 1/2007 | Liu | B60R 25/0225 340/426.31 |

(Continued)

FOREIGN PATENT DOCUMENTS

ES 2602492 T3 2/2017

*Primary Examiner* — Drew J Brown
(74) *Attorney, Agent, or Firm* — Christopher J. Volkmann; Kelly, Holt & Christenson PLLC

(57) ABSTRACT

A work vehicle, door state determination system, and method of determining a state of a door are provided. The work vehicle includes a prime mover configured to supply propulsion force to the work vehicle, an undercarriage comprising a plurality of ground engaging members, an upper portion disposed above the undercarriage, a door pivotably coupled to the upper portion, at least one camera configured to capture image data from an area outside of the work vehicle, the image data comprising captured door image data, and a controller configured to store reference door image data, receive the captured door image data, determine a state of the door based on the captured door image data and the reference door image data, and initiate a door state response based on the state of the door.

19 Claims, 3 Drawing Sheets

(56) References Cited

U.S. PATENT DOCUMENTS

| | | | |
|---|---|---|---|
| 2012/0217764 A1* | 8/2012 | Ishiguro | B60R 1/00 |
| | | | 296/1.07 |
| 2013/0002877 A1* | 1/2013 | Miyoshi | B60R 1/00 |
| | | | 348/148 |
| 2013/0096733 A1* | 4/2013 | Manotas, Jr. | G06V 20/593 |
| | | | 701/2 |
| 2013/0311001 A1* | 11/2013 | Hampiholi | B60R 25/25 |
| | | | 701/1 |
| 2014/0172248 A1 | 6/2014 | Nickel | |
| 2015/0066237 A1* | 3/2015 | Kwon | H04N 7/181 |
| | | | 701/1 |
| 2016/0300410 A1* | 10/2016 | Jones | B60R 25/2045 |
| 2017/0086377 A1 | 3/2017 | Jongmans et al. | |
| 2017/0166167 A1* | 6/2017 | Heller | B60R 25/24 |
| 2018/0187472 A1* | 7/2018 | Ikeda | B60R 25/305 |
| 2019/0109988 A1* | 4/2019 | Lin | G06T 7/33 |
| 2019/0366981 A1* | 12/2019 | Huang | B60R 25/252 |
| 2019/0370578 A1* | 12/2019 | Meng | G06V 10/751 |
| 2020/0238952 A1* | 7/2020 | Lindsay | B60R 25/40 |
| 2020/0269812 A1* | 8/2020 | Song | B60R 25/04 |
| 2021/0221329 A1* | 7/2021 | Mueller | B60R 25/24 |
| 2021/0309181 A1* | 10/2021 | Kale | G06V 10/764 |
| 2021/0370867 A1* | 12/2021 | Morosawa | B60R 25/2045 |
| 2021/0370883 A1* | 12/2021 | Morosawa | B60R 25/102 |
| 2022/0017044 A1* | 1/2022 | Bielby | G06V 20/59 |
| 2022/0024415 A1* | 1/2022 | Wu | G06V 40/172 |
| 2022/0055573 A1* | 2/2022 | Kim | G06V 40/172 |
| 2022/0222465 A1* | 7/2022 | Thooris | B60R 25/25 |
| 2022/0306042 A1* | 9/2022 | Liu | H04N 5/23241 |
| 2023/0077868 A1* | 3/2023 | Burns | B60R 25/305 |
| | | | 348/148 |

\* cited by examiner

WORK VEHICLE, DOOR STATE DETERMINATION SYSTEM, AND METHOD OF DETERMINING STATE OF WORK VEHICLE DOOR

BACKGROUND

Work vehicles operate in work areas to accomplish such tasks as earth moving, pulling, harvesting or other agricultural operations, hauling, and/or other tasks with occasional or frequent movement of the work vehicle to new locations within or outside of the work area. Work vehicles may operate in such a way that it may be desirable for an operator to be aware of the presence of objects such as obstacles, personnel, or other vehicles that are near, but spaced from the work vehicle for purposes of security, safety, and control of the work vehicle during operation in the work area. The work vehicle may include an object detection system that utilizes one or more cameras or other object identification or sensing devices located on or in the work vehicle to determine the presence of and/or identify such objects.

Further, work vehicles, such as construction and agricultural vehicles in non-limiting examples, may include one or more operator, access, or service doors that open to allow access by an operator or service professional to an engine compartment, mechanical, hydraulic, or electrical component area, operator station, or other area of the work vehicle. Such doors generally remain closed when access is not needed and/or during operation of the work vehicle.

SUMMARY

Various aspects of examples of the present disclosure are set out in the claims.

In accordance with an embodiment of the present disclosure, a work vehicle includes a prime mover configured to supply propulsion force to the work vehicle, an undercarriage comprising a plurality of ground engaging members, an upper portion disposed above the undercarriage, a door pivotably coupled to the upper portion, at least one camera configured to capture image data from an area outside of the work vehicle, the image data comprising captured door image data, and a controller configured to store reference door image data, receive the captured door image data, determine a state of the door based on the captured door image data and the reference door image data, and initiate a door state response based on the state of the door.

The image data may further comprise captured object image data, and the controller may be further configured to store reference object image data and determine the presence of an object in the area outside of the work vehicle based on the captured object image data and the reference object image data. The reference door image data may comprise stored images of reference door images, and the controller may be configured to determine the state of the door based on comparison of the captured door image data with the reference door image data. The controller may be further configured to initiate the door state response by transmitting a response signal to disable the prime mover. The controller may be further configured to initiate the door state response by transmitting a response signal to an operator of the work vehicle. The captured door image data may comprise at least one image of the door. The at least one camera may be coupled to the door, and the captured door image data may comprise at least one image of an area outside of the door.

In accordance with an embodiment of the present disclosure, a door state determination system for a work vehicle having a door pivotably coupled to the work vehicle includes at least one camera coupled to an upper portion of the work vehicle and configured to capture image data of an area outside of the work vehicle, the image data comprising captured door image data, and a controller configured to store reference door image data, receive the captured door image data, determine a state of the door based on the captured door image data and the reference door image data, and initiate a door state response based on the state of the door.

The image data may further comprise captured object image data, and the controller may be further configured to store reference object image data and determine the presence of an object in the area outside of the work vehicle based on the captured object image data and the reference object image data. The reference door image data may comprise stored images of reference door images, and the controller may be configured to determine the state of the door based on a comparison of the captured door image data with the reference door image data. The controller may be further configured to initiate the door state response by transmitting a response signal to an operator of the work vehicle. The captured door image data may comprise at least one image of the door. The at least one camera may be coupled to the door, and the captured door image data may comprise at least one image of an area outside of the door.

In accordance with an embodiment of the present disclosure, a method of determining a state of a door pivotably coupled to a work vehicle includes actuating at least one camera coupled to an upper portion of the work vehicle to capture with the at least one camera image data from an area outside of the work vehicle that includes captured door image data, storing reference door image data, determining the state of the door based on the captured door image data and reference door image data, and actuating a door state response based on the state of the door.

The method may further include capturing with the at least one camera captured object image data from the area outside of the work vehicle, storing reference object image data, and determining the presence of an object in the area outside of the work vehicle based on the captured object image data and the reference object image data. The reference door image data may further comprise stored images of reference door images, and determining the state of the door may be based on a comparison of the captured door image data with the reference door image data. Actuating the door state response may comprise disabling a prime mover of the work vehicle. Actuating the door state response may further comprise transmitting a response signal to an operator of the work vehicle. The captured door image data may comprise at least one image of the door. The at least one camera may be coupled to the door and actuating the at least one camera to capture the image data from the area outside of the work vehicle may comprise capturing at least one image of an area outside of the door.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
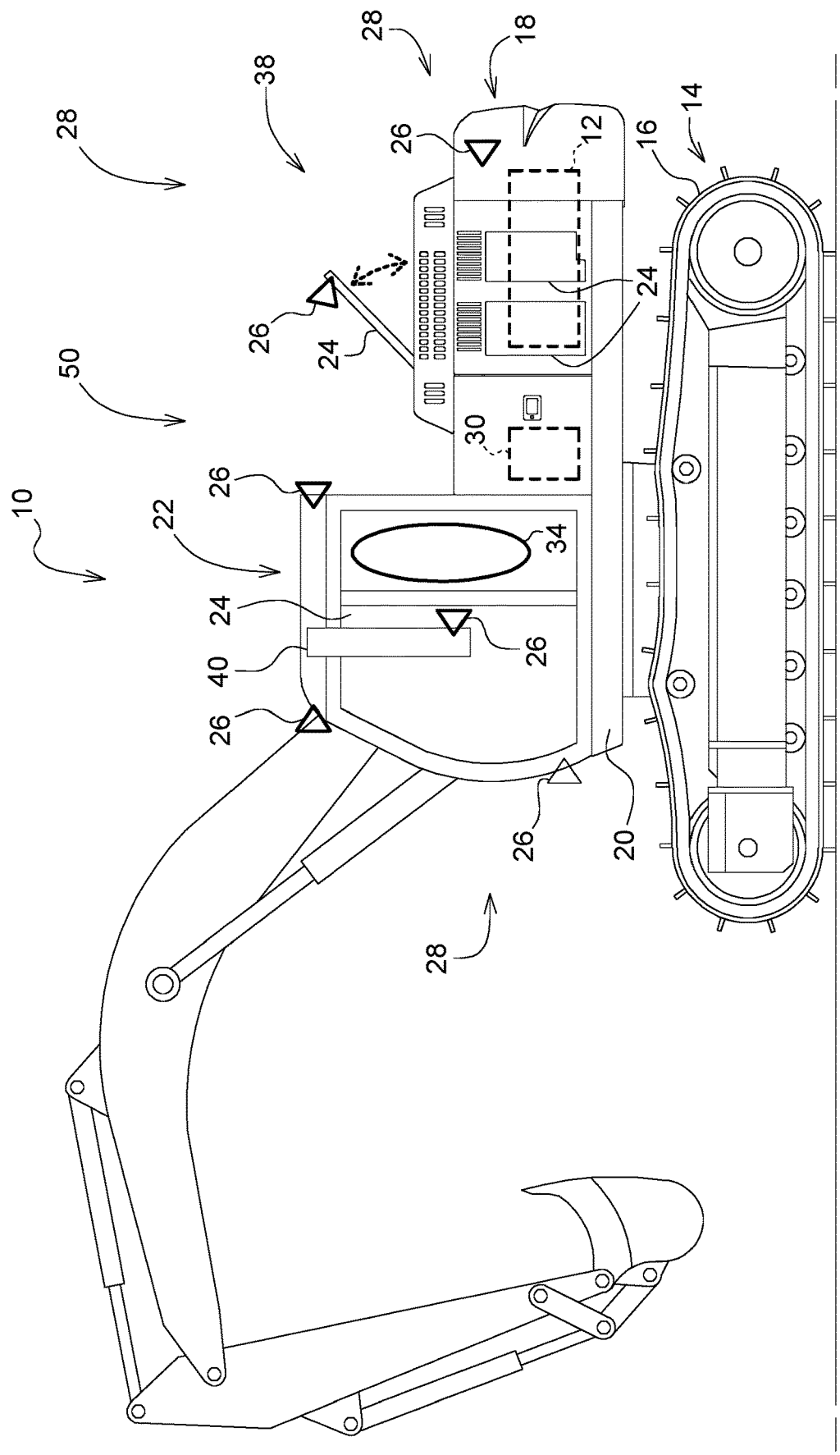
FIG. 1 is a side elevation view of a work vehicle and door state determination system in accordance with an embodiment of the present disclosure.
Figure 2:
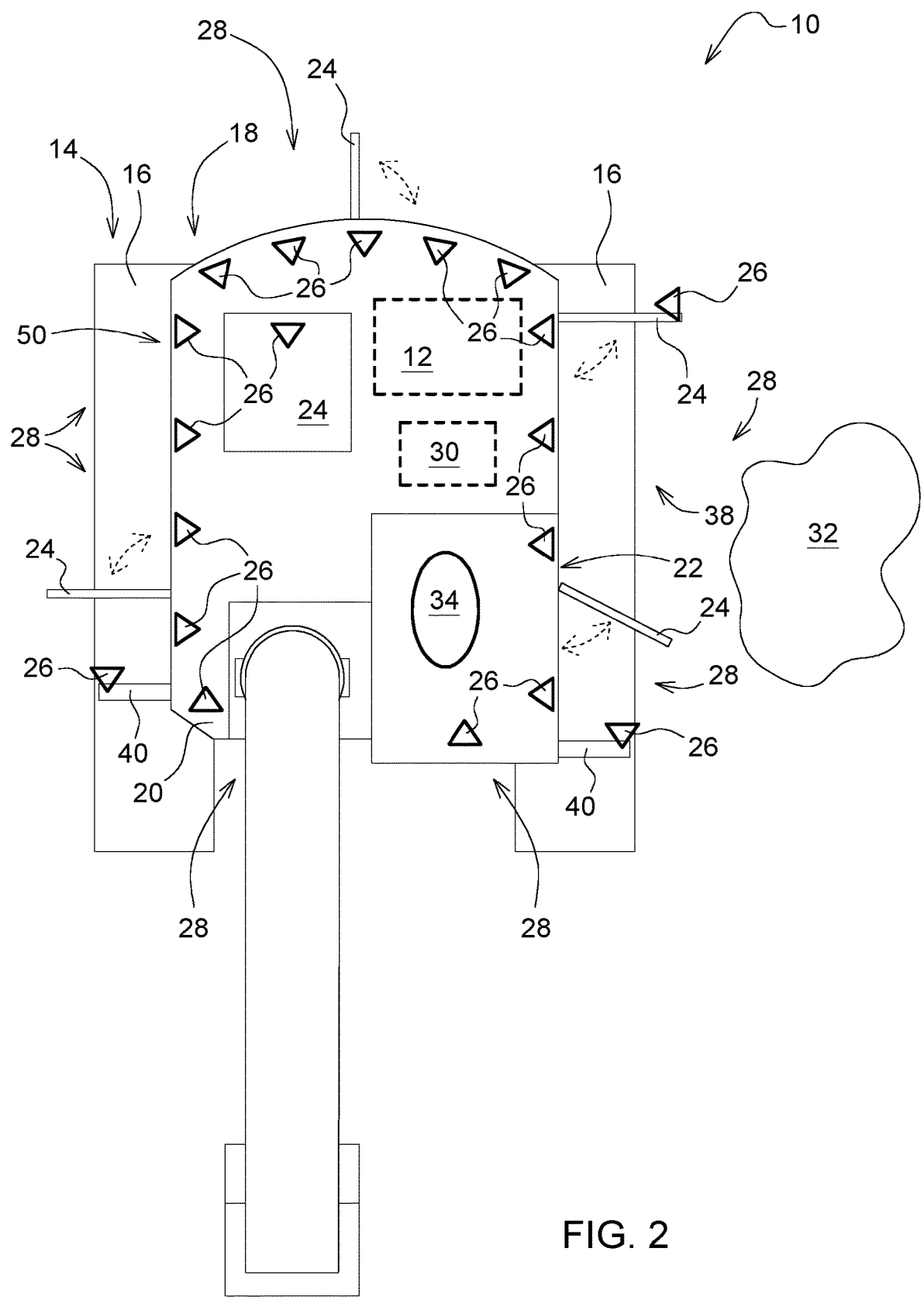
FIG. 2 is a top plan view of a work vehicle and door state determination system in accordance with an embodiment of the present disclosure.
Figure 3:
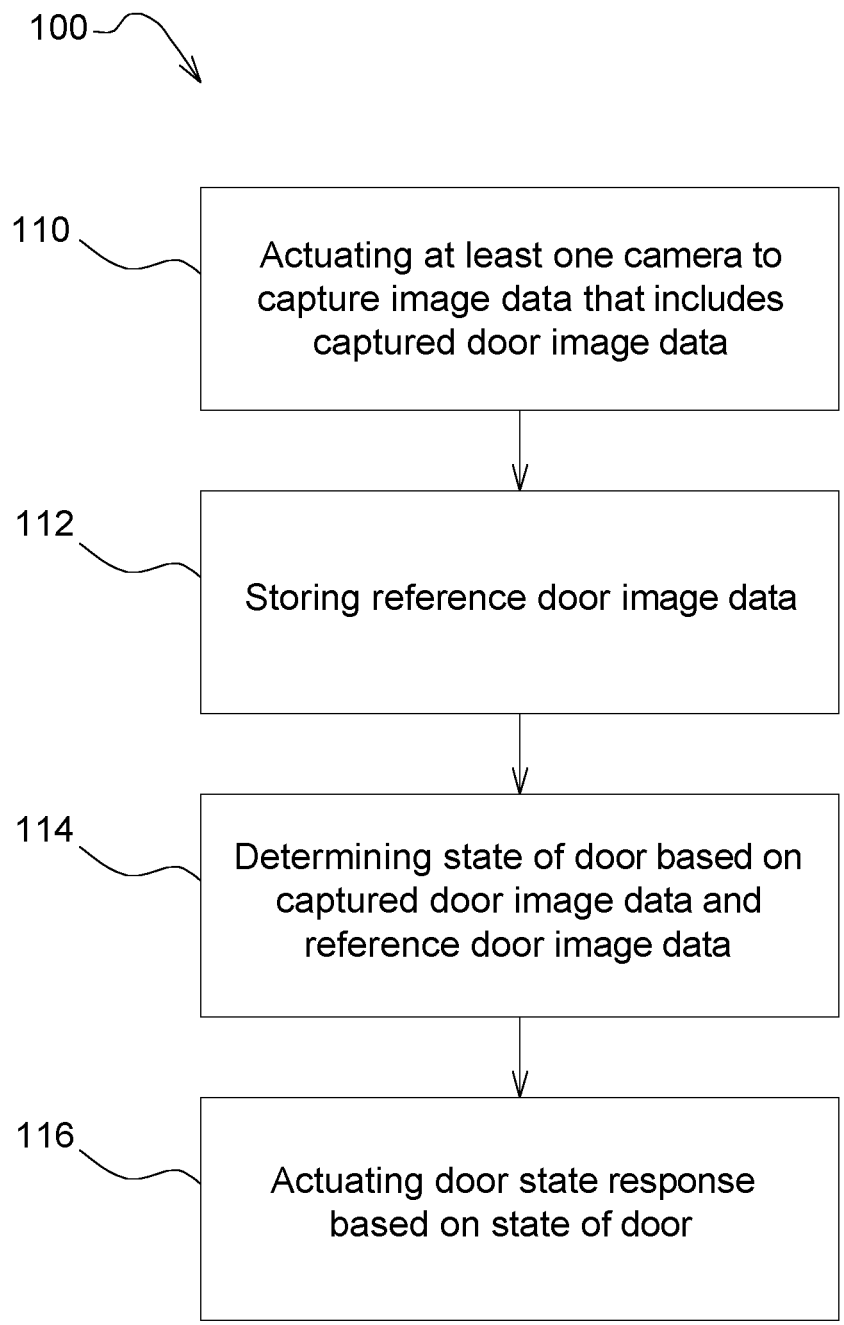
FIG. 3 illustrates a method of determining a state of a door of a work vehicle in accordance with an embodiment of the present disclosure.

At least one embodiment of the subject matter of this disclosure is understood by referring to FIGS. 1 through 3 of the drawings.

Referring now to FIGS. 1 and 2, a work vehicle 10 is illustrated in accordance with an embodiment of the present disclosure. The work vehicle 10 illustrated in FIGS. 1 and 2 is an excavator, but the work vehicle 10 of one or more embodiments of the present disclosure is another construction work vehicle, such as a wheel loader, a dozer, or a motor grader to name non-limiting examples, an agricultural work vehicle, a utility vehicle, or another off-road or work vehicle.

The work vehicle 10 in the illustrated embodiment includes a prime mover 12 configured to propel, move, and/or supply propulsion force to the work vehicle 10. The prime mover 12 is an internal combustion engine, such as a diesel engine, in the illustrated embodiment and/or is an electric, hydraulic, pneumatic, or other motor or device in one or more additional embodiments. The prime mover 12 of various embodiments is configured to directly or indirectly provide propulsion force to the work vehicle 10, such as via a direct drive connection, a mechanical coupling and/or transmission, an electrical generator, and/or a hydraulic pump in non-limiting examples.

The work vehicle 10 in the illustrated embodiment further includes an undercarriage 14 having one or more ground engaging members 16. The ground engaging members 16 of the work vehicle 10 shown in FIG. 1 include tracks. In one or more additional embodiments, the ground engaging members 16 include one or more wheels and/or other movable members.

The work vehicle 10 in the illustrated embodiment of FIG. 1 further includes an upper portion 18 disposed generally above the undercarriage 14. In the illustrated embodiment, the upper portion 18 includes a chassis 20 of the work vehicle 10 and an operator station 22 configured to position an operator 34. In the illustrated embodiment, the upper portion 18 is pivotably coupled to the undercarriage 14 and, in additional embodiments not illustrated, the upper portion 18 is located between and/or above the ground engaging members 16, such as in a wheel loader or motor grader. The ground engaging members 16 include wheels or track assemblies in non-limiting embodiments.

The work vehicle 10 of the embodiments of the present disclosure further includes one or more door(s) 24 pivotably coupled to the upper portion 18. The door(s) 24 of various embodiments includes one or more engine, hydraulics, electrical, control, and/or service panel(s) and/or one or more door(s), hatch(es), or panel(s) on the operator station 22 and/or another portion of the upper portion 18. In one or more embodiments, the door 24 forms the outermost surface of the upper portion 18.

The operator 34 positioned at the operator station 22 of the illustrated embodiment controls the work vehicle 10 from the operator station 22 using one or more work vehicle control(s) (not shown) including, without limitation, a steering wheel, a joystick, and/or another interface or engagement device. In additional embodiments not illustrated, the operator 34 is located outside of the operator station 22 or remote from the work vehicle 10 and able to at least partially control the work vehicle 10 from a remote location.

As shown in FIGS. 1 and 2, one or more embodiments of a door state determination system 50 for the work vehicle 10 is further provided. The work vehicle 10 and system 50 of the embodiments of the present disclosure further includes one or more camera(s) 26 configured to capture image data. The work vehicle 10 and the system 50 of one or more embodiments includes a controller 30 configured to capture or receive, store, transmit, and/or process image data.

In one or more embodiments, the image data includes captured object image data. The work vehicle 10 and/or the system 50 utilizes the object image data to determine the presence of and/or identify an object 32 spaced from the work vehicle 10 within a sensing, capturing, or detecting distance. The controller 30 of an embodiment is further configured to receive or capture, process, and/or store captured and/or reference object image data. The reference object image data includes sample object images, image data constraint values, and/or predetermined threshold value(s) that are associated with the presence and/or identification of the object 32. The controller 30 of the embodiment is configured to determine the presence of and/or identify the object 32 in an area 28 outside of the work vehicle 10 and/or the area 38 outside of the door 24 based on the captured object image data and the reference object image data.

The one or more camera(s) 26 of embodiments include one or more still, video, time series of images, and/or other image-capturing devices configured to provide image data for object identification. The camera(s) 26 in one or more embodiments includes multispectral and/or hyperspectral camera(s) and/or any other devices for capturing spectral images. The camera(s) 26 of particular embodiments are configured to detect visible light, infrared radiation, or otherwise. In an embodiment, the camera(s) 26 include or form a stereo camera having two or more lenses with a separate image sensor for each lens or two or more cameras 26 combine to form a stereo camera. Stereo images (e.g., stereoscopic photos) captured by a stereo camera allow for computer stereo vision that extracts three-dimensional information from the images described in the embodiments herein. In additional embodiments, one or more of the camera(s) 26 includes other object identification and/or sensing devices such as radar, laser, sonar, infrared, or other devices or methods capable of determining the presence of objects within a predetermined distance from the device.

One or more of the cameras 26 is/are configured to capture image data from the area(s) 28 outside of the work vehicle 10 as shown in the illustrative embodiment of FIG. 2. The area 28 may include one or more areas located on any side of the work vehicle 10 and/or above the work vehicle 10 and may be the same as or different from the area 38 outside of the door 24. The camera(s) 26 are configured to create and/or transmit captured door image data.

The controller 30 is configured to receive, process, and/or store reference door image data. In one embodiment, the reference door image data includes stored images of reference door images. In such embodiments, the controller 30 is configured to determine the state of the door 24 based on a comparison of the captured door image data with the reference door image data.

In at least one embodiment, the image data includes captured door image data. The controller 30 is further configured, in one or more embodiments, to receive the captured door image data. The captured door image data of an embodiment includes one or more image(s) of the door 24. In various embodiments, the captured door image data includes a photograph or other image or images, brightness values, color values, sharpness values, and/or other data configured to detect changes upon the opening or closing of one or more of the door(s) 24. In a specific non-limiting illustrative example, the captured door image data includes data representing or associated with a change in brightness to indicate the door 24 blocking light from the camera 26. In a further non-limiting example, the captured door image data includes data indicating an increase in a predetermined color to indicate the door 24 of the predetermined color being in an open position.

In an embodiment, one or more of the camera(s) 26 is/are coupled to at least one door 24 as illustrated in FIG. 2. The captured door image data in the embodiment includes one or more images an area 38 outside of the door. When the door 24 is in an open state, the captured door image data differs from captured door image data when the door 24 is in a closed state. The captured door image data is transmitted and processed in accordance with corresponding reference door image data for door image data captured from camera(s) 26 coupled to the door 24 to determine the state of the door 24. Similarly, the one or more camera(s) 26 are located in particular embodiments on or in a side-view mirror 40 or other mirror or exterior feature of the work vehicle 10.

The controller 30 is further configured, in one or more embodiments, to determine a state of the door(s) 24 based on the captured door image data and the reference door image data. The controller 30 includes control logic to evaluate the door image data. The controller 30, the work vehicle 10, and/or the system 50 of the illustrated embodiment includes one or more processors onboard and/or remotely located from the work vehicle 10. The work vehicle 10 and/or the system 50 may further include a communication system configured to communicate with another onboard or remote system, one or more processors or servers, a data storage location, and/or another component. The controller 30, the work vehicle 10, and/or the system 50 includes image processing components configured to process the object image data, door image data, and/or other images or data captured by the camera(s) 26. The captured images and/or image data of various embodiments represent a spectral response captured by the camera(s) 26 that are provided to a door image evaluation system and/or stored in data memory.

In an embodiment, an image processing system includes the camera(s) 26 to take spectral images of the area 28. The door image data and/or object image data are transmitted to an evaluation system having one or more processors, a communication system, memory to store data, an image analysis system, and/or other components. An image analysis system includes image receiving logic configured to receive images from the image capture system and image processing logic configured to process the image data. The image analysis system of one or more embodiments includes a shadow corrector for correcting shadows on the images, an illumination normalizer configured to normalize illumination of the image, and/or an image combiner configured to combine or stitch images together that are captured across the system.

The controller 30 is further configured, in one or more embodiments, to initiate a door state response based on the state of the door(s) 24. In an illustrative embodiment, when one or more of the doors 24 is in an open state, the controller 30 initiates a response signal as the door state response. In an embodiment, the controller 30 is configured to initiate the door state response by transmitting a response signal to disable the prime mover 12. Accordingly, the operator 34, either located in the operator station 22 or remotely, is unable to start the prime mover 12, such as the engine that powers the work vehicle 10, thereby improving the safety and security of the work vehicle 10 and its surroundings. In an embodiment, the controller 30 is configured to initiate the door state response, such as when one or more doors 24 are in an open state, by transmitting a response signal to the operator 34 of the work vehicle. The response signal may be transmitted in certain embodiments to the operator 34 at the operator station 22 via an alert on the control interface or other notification or to the operator 34 located outside of the operator station 22, such as for a remote start or remote or autonomous operation, via wireless or wired communication to the operator 34. The door state response as a response signal notifies the operator 34 to allow the operator 34 to close the door(s) 24 and/or take or refrain from taking certain actions.

Referring now to FIG. 3, a method 100 of determining the state of the door(s) 24 pivotably coupled to the work vehicle 10 is provided in accordance with one or more embodiments of the present disclosure. The method 100 includes actuating, at step 110, at least one of the cameras 26 coupled to the upper portion 18 of the work vehicle 10 to capture with the camera(s) 26 image data from the area 28 outside of the work vehicle 10 that includes captured door image data. The method 100 further includes storing, at step 112, reference door image data. The method 100 further includes determining, at step 114, the state of the door 24 based on the captured door image data and the reference door image data. The method 100 further includes actuating, at step 116, a door state response based on the state of the door 24.

The method 100 of additional embodiments includes capturing with the camera(s) 26 captured object image data from the area 28 outside of the work vehicle 10, storing reference object image data, and/or determining the presence of the object 32 in the area 28 outside of the work vehicle 10 based on the captured object image data and the reference object image data. Determining the state of the door 24 in an embodiment of the method 100 is based on a comparison of the captured door image data with the reference door image data. In an embodiment, actuating the door state response includes disabling the prime mover 12 of the work vehicle 10. Actuating the door state response in an embodiment of the method 100 includes transmitting a response signal to the operator 34 of the work vehicle 10. Actuating the camera(s) 26 to capture the image data from the area 28 outside of the work vehicle 10 includes capturing one or more images of the area 38 outside of the door 24. Any feature, step, function, or structure described with regard to the embodiments of the work vehicle 10 and/or the system 50 is/are applied to the method 100, and vice versa, in additional embodiments of the present disclosure.

Without in any way limiting the scope, interpretation, or application of the claims appearing below, it will be appreciated that the work vehicle 10, the system 50, and the method 100 enable the operator 34 to determine if one or more door(s) 24 is/are in an open state and, therefore, whether a need would exist to close the door(s) 24 or take other action. Further, the work vehicle 10, the system 50, and the method 100 provide such benefits without additional components beyond object identification components and systems found on the work vehicle 10. The work vehicle 10, the system 50, and the method 100 further provide the ability to adjust or tune the image data received by the camera(s) 26 to provide vehicle state information and enhance the safety, security, and control of the work vehicle 10.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A work vehicle comprising:
    a prime mover configured to supply propulsion force to the work vehicle;
    an undercarriage comprising a plurality of ground engaging members;
    an upper portion disposed above the undercarriage;
    a first door pivotally coupled to the upper portion of the work vehicle and being openable to provide access to a first interior of the upper portion, the first interior configured to position an occupant;
    a second door pivotably coupled to the upper portion and being pivotable to an open position to provide access to a second interior of the upper portion, wherein the second interior is separate from the first interior and is configured to house a component of the work vehicle;
    at least one camera configured to capture door image data from an area outside of the work vehicle, the door image data comprising at least one image of the second door, wherein the second door is moved relative to the at least one camera as the second door is pivoted to the open position; and
    a controller configured to store reference door image data, receive the captured door image data, determine a state of the second door based on a visual representation of the second door in the at least one image and the reference door image data, and initiate a door state response based on the state of the second door.

2. The work vehicle of claim 1, wherein the work vehicle comprises an off-road earth moving machine having an earth moving implement controllable relative to the upper portion.

3. The work vehicle of claim 2, wherein the off-road earth moving machine comprises an excavator, wheel loader, a dozer, or a motor grader.

4. The work vehicle of claim 1, wherein the reference door image data comprises stored images of reference door images, the controller being configured to determine the state of the second door based on comparison of the door image data with the reference door image data.

5. The work vehicle of claim 1, wherein the controller is further configured to initiate the door state response by transmitting a response signal to disable the prime mover.

6. The work vehicle of claim 1, wherein the controller is further configured to initiate the door state response by transmitting a response signal to the occupant of the work vehicle.

7. The work vehicle of claim 1, wherein the visual representation comprises values, in the image, that represent the second door, the values comprising one or more of a brightness value, a color values, or a sharpness value.

8. The work vehicle of claim 1, wherein the upper portion is pivotably coupled to the undercarriage.

9. A door state determination system for a work vehicle having a first door coupled to an upper portion of the work vehicle and being openable to provide access to a first interior, a second door coupled to the upper portion of the work vehicle and being openable to provide access to a second interior, the first interior configured to position an occupant, the second interior separate from the first interior and configured to house a component of the work vehicle, the door state determination system comprising:
    at least one camera coupled to the upper portion of the work vehicle and configured to capture image data of an area outside of the work vehicle, the image data comprising captured door image data, the captured door image data comprising at least one image of the second door; and
    a controller configured to obtain reference door image data comprising one or more reference door images, determine a state of the second door based on a comparison of the captured door image data with the reference door image data, and initiate a door state response based on the state of the second door.

10. The door state determination system of claim 9, wherein the work vehicle comprises an off-road earth moving machine having an earth moving implement controllable relative to the upper portion.

11. The door state determination system of claim 10, wherein the off-road earth moving machine comprises an excavator, wheel loader, a dozer, or a motor grader.

12. The door state determination system of claim 9, wherein the controller is further configured to initiate the door state response by transmitting a response signal to the occupant of the work vehicle.

13. The door state determination system of claim 9, wherein the reference door image data is captured by the at least one camera and stored in a data store.

14. A method of determining a state of a first door coupled to an upper portion of a work vehicle and openable to provide access to a first interior that is configured to house a component of the work vehicle and is separate from a second interior that is accessible by an openable second door coupled to the upper portion of the work vehicle and that is configured to position an occupant, the method comprising:

capturing, with at least one camera, image data from an area outside of the work vehicle, the image data comprising captured door image data including at least one image of the first door;

determining the state of the first door based on changes in a visual representation of the first door defined by values in the at least one image of the first door; and actuating a door state response based on the state of the first door.

15. The method of claim 14, wherein the values comprising one or more of a brightness value, a color values, or a sharpness value.

16. The method of claim 14, wherein the work vehicle comprises an off-road earth moving machine having an earth moving implement controllable relative to the upper portion.

17. The method of claim 14, wherein actuating the door state response comprises disabling a prime mover of the work vehicle.

18. The method of claim 14, wherein actuating the door state response comprises transmitting a response signal to the occupant of the work vehicle.

19. The method of claim 14, wherein the values represent a color of the first door.

\* \* \* \* \*